(12) United States Patent
Samhammer

(10) Patent No.: US 6,498,297 B2
(45) Date of Patent: Dec. 24, 2002

(54) SELF-CLOSING ELECTRICAL RACEWAY AND DEDICATED SEAT TRACK COVER

(75) Inventor: Christopher Samhammer, Aliso Viejo, CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/832,077

(22) Filed: Apr. 9, 2001

(65) Prior Publication Data

US 2002/0144835 A1 Oct. 10, 2002

(51) Int. Cl.[7] .................................................. H02G 3/00
(52) U.S. Cl. .................... 174/72 A; 174/72 R; 174/101; 52/220.7
(58) Field of Search ............................ 174/68.3, 72 A, 174/72 R, 101, 99 R; 361/826; 220/3.2, 3.3; 52/220.7

(56) References Cited

U.S. PATENT DOCUMENTS

| | | | | |
|---|---|---|---|---|
| 4,635,886 A | * | 1/1987 | Santucci et al. | 248/73 |
| 5,235,136 A | * | 8/1993 | Santucci et al. | 174/68.3 |
| 6,107,576 A | * | 8/2000 | Morton et al. | 174/101 |
| 6,284,974 B1 | * | 9/2001 | Albert et al. | 174/68.3 |
| 6,333,461 B1 | * | 12/2001 | Marcou et al. | 174/68.3 |

* cited by examiner

Primary Examiner—Dean A. Reichard
Assistant Examiner—W. David Walkenhorst
(74) Attorney, Agent, or Firm—DiPinto & Shimokaji, P.C.

(57) ABSTRACT

A protective wiring assembly includes a raceway having a top portion, a bottom portion that is opposite the top portion, and a self-closing portion intermediate the top and bottom portions. The bottom portion has a bottom locking rib and interfaces a support on which the assembly can be disposed. The self-closing portion has a top locking rib and a top guide rib. The top locking rib is engageable to the bottom locking rib. A cover interfaces the top portion of the raceway. The cover has a pair of retention legs and a load bearing rib that transmits force from the top portion to the support.

29 Claims, 4 Drawing Sheets

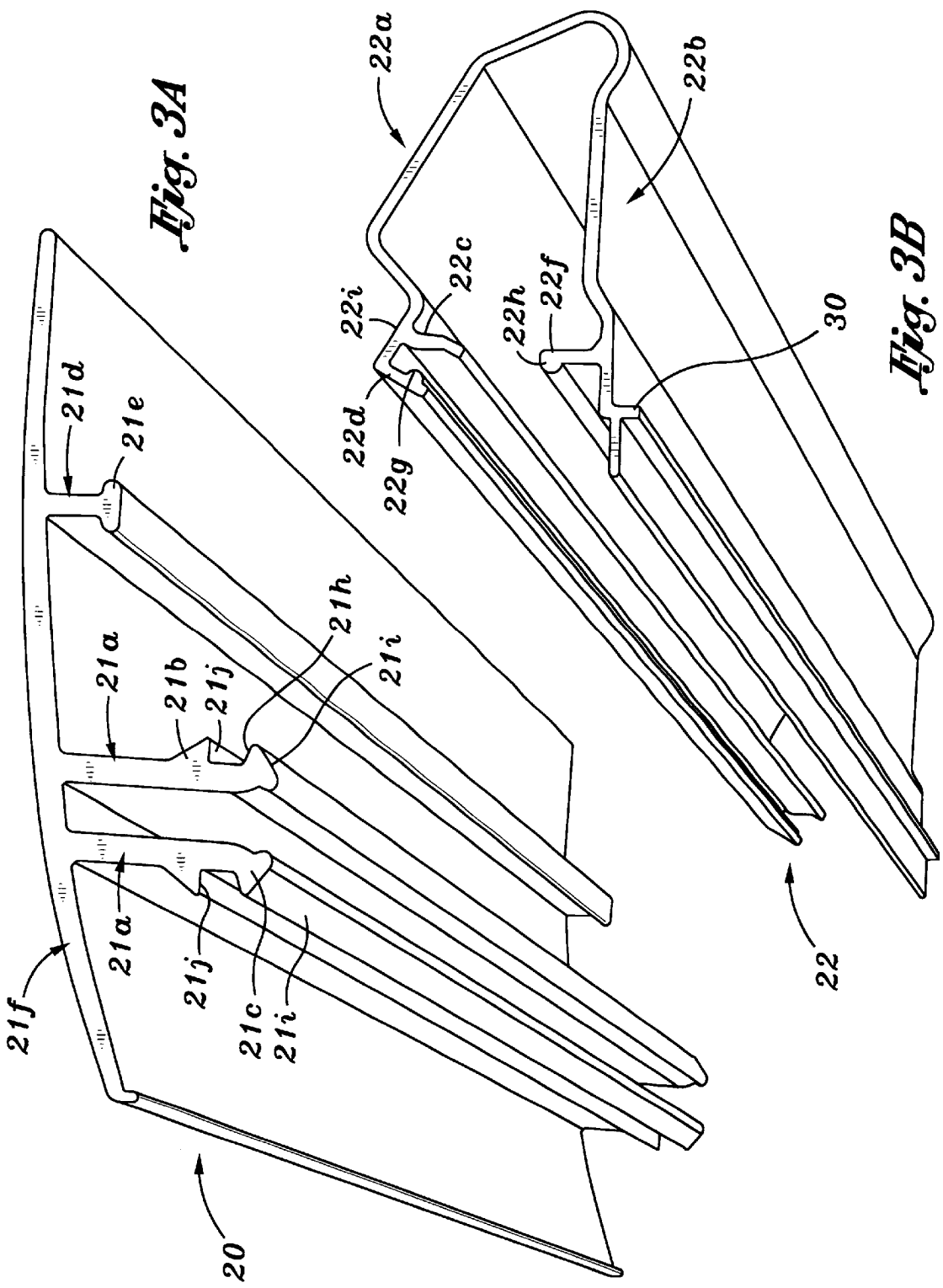

SELF-CLOSING ELECTRICAL RACEWAY AND DEDICATED SEAT TRACK COVER

BACKGROUND OF THE INVENTION

The present invention generally relates to a seat-to-seat wiring assembly such as in a passenger aircraft and, more specifically, to a wiring assembly having an electrical raceway that provides a conduit for a wire harness and a seat track cover that protects the raceway from damage, such as from feet and luggage.

Airline passenger seats that have electrical requirements use seat-to-seat wiring harnesses that originate shipside and also utilize existing cabin carpeting to cover the wiring or raceways to route the wiring. The wiring is held in place with the carpet, using adhesive carpet tape, for the length of the main cabin.

FIG. 1 depicts a cross sectional view looking forward in an aircraft of a typical seat-to-seat wiring assembly 10 employed in the past. The assembly 10 is often installed adjacent a seat leg 14 having a fastener for fastening a portion of the seat to the leg 14. Wiring 13 is routed under an outboard strip of carpet 18. In turn, the carpet 18 is held in place by carpet tape 12 along the bottom of a main cabin side wall 15, as well as outboard of the seat row leg 14, for most of the length of the aircraft main cabin. Because the carpet 18 alone unsatisfactorily covers the wiring 13 and the seat track 17, a cover 19 caps the carpet 18 between the seat rows. The cover 19 includes legs 19a that are captured in a seat track 17.

However, the use of adhesive carpet tape to hold the wiring in place under the cabin carpet has made it difficult to control and route the wire bundles. It also prevents the carpet from lying flat, which exposes the wiring as it approaches or lies near the carpet edges. Additionally, the wiring has to be installed after the seats are in place due to requirements of the assembly sequence. The result has been extraordinarily tight quarters between the seat rows and cabin side walls into which mechanics and electricians have been forced to squeeze themselves to install the wire harness. The past seat-to-seat wiring design has also made it difficult to route the harnesses neatly under the typical two-inch wide strip of carpet, before connecting the harnesses to each seat row.

As can be seen, there is a need for an improved apparatus for installing and protecting wire harnesses such as in a seat-to-seat application for aircraft.

SUMMARY OF THE INVENTION

In one aspect of the present invention, a protective wire routing apparatus comprises a raceway having a first portion, a second portion that is opposite the first portion, and a self-closing portion intermediate the first and second portions; and a cover that is configured to interface one of the first and second portions of the raceway; with the cover having a first rib to transmit force to one of the first and second portions.

In another aspect of the present invention, a seat-to-seat wiring assembly comprises a raceway having a top portion, a bottom portion that is opposite the top portion, and a self-closing portion intermediate the top and bottom portions, with the bottom portion interfacing a support on which the assembly can be disposed; and a cover that interfaces the top portion of the raceway, with the cover having a load bearing rib that transmits force from the top portion to the self-closing portion, from the self-closing portion to the bottom portion, and from the bottom portion to the support.

In a further aspect of the present invention, a raceway for protecting wiring comprises a top portion; a bottom portion that is opposite the top portion; and a self-closing portion intermediate the top and bottom portions; the self-closing portion having a top locking rib and a top guide rib; the top locking rib having a top engagement bump; the top guide rib interfaces the bottom portion to transmit force from the top portion to the bottom portion; the bottom portion having a bottom locking rib that is configured to be disposed between the top locking rib and top guide rib; and the bottom locking rib having a bottom engagement bump to frictionally engage the top engagement bump.

These and other features, aspects and advantages of the present invention will become better understood with reference to the following drawings, description and claims.

BRIEF DESCRIPTION OF THE DRAWINGS

FIG. 3A is a perspective view of the cover shown in FIG. 2B;

FIG. 3B is a perspective view of the raceway shown in FIG. 2C.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Although the present invention is described in the context of an aircraft, the present invention is not so limited. Rather, the present invention can be utilized in general where wiring needs to be routed and protected. For example, the present invention may be used in the context of ground vehicles, such as buses.

In general, the present invention provides a wiring assembly, such as a seat-to-seat wiring assembly, that can be employed in aircraft like the Boeing 717, MD-90 and MD-80. Unlike prior designs, however, the present invention provides protection to and enables ease of routing of wiring by providing a self-closing raceway within which the wiring is placed. Further, and in contrast to prior designs, a cover of the present invention cooperates with the raceway to transmit forces (particularly vertical forces), as from an aircraft passenger or luggage. This transmission of force is from the cover, then to the raceway, and finally to a support such as a seat track on which the assembly is disposed. The self-closing aspect of the present raceway is provided by a top guide rib that guides a top portion of the raceway in juxtaposition to a bottom portion of the raceway. A top locking rib can then frictionally engage a bottom locking rib.

Figure 1:
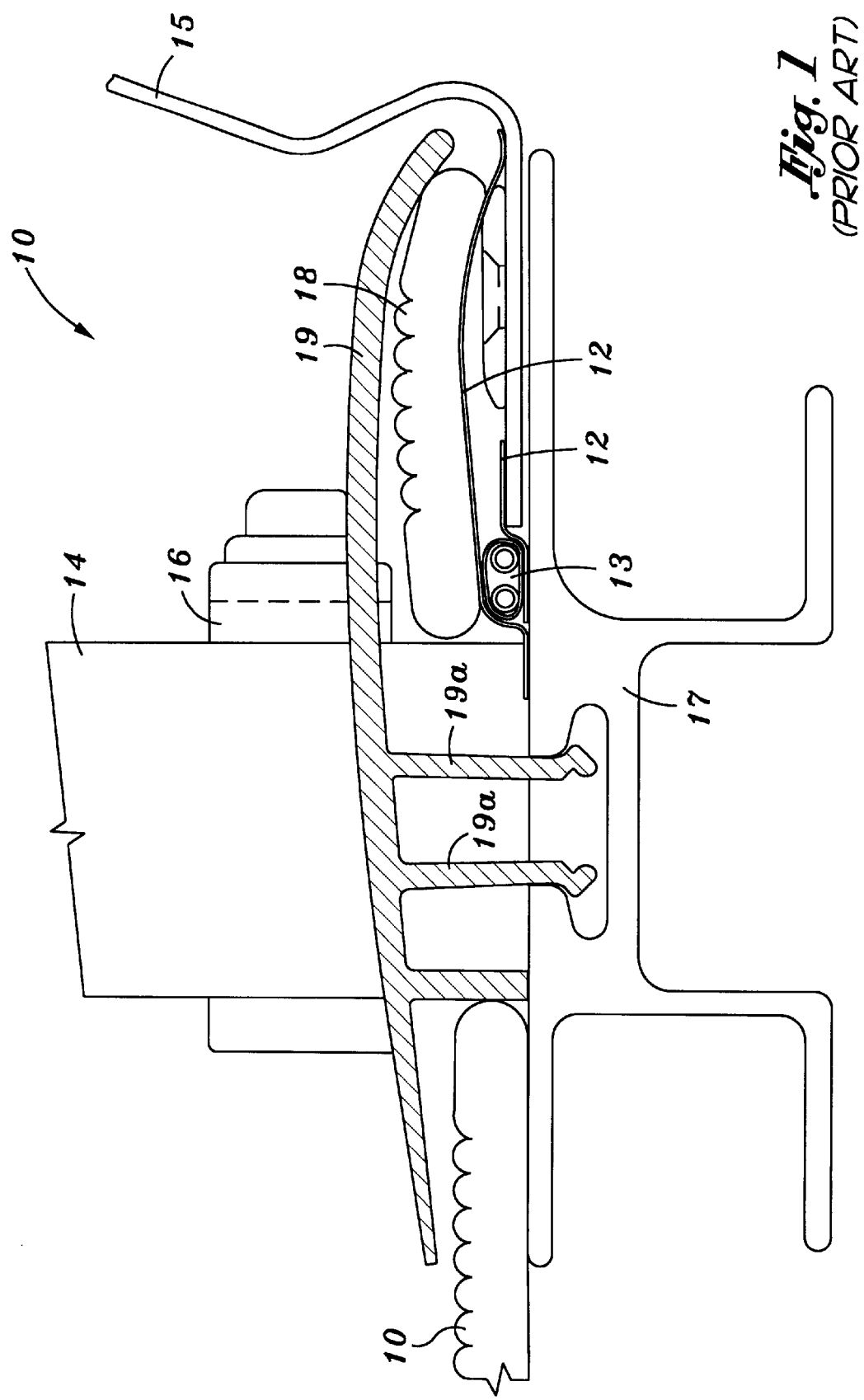
FIG. 1 is a cross sectional view of a prior art seat-to-seat wiring assembly.
Figure 2A:
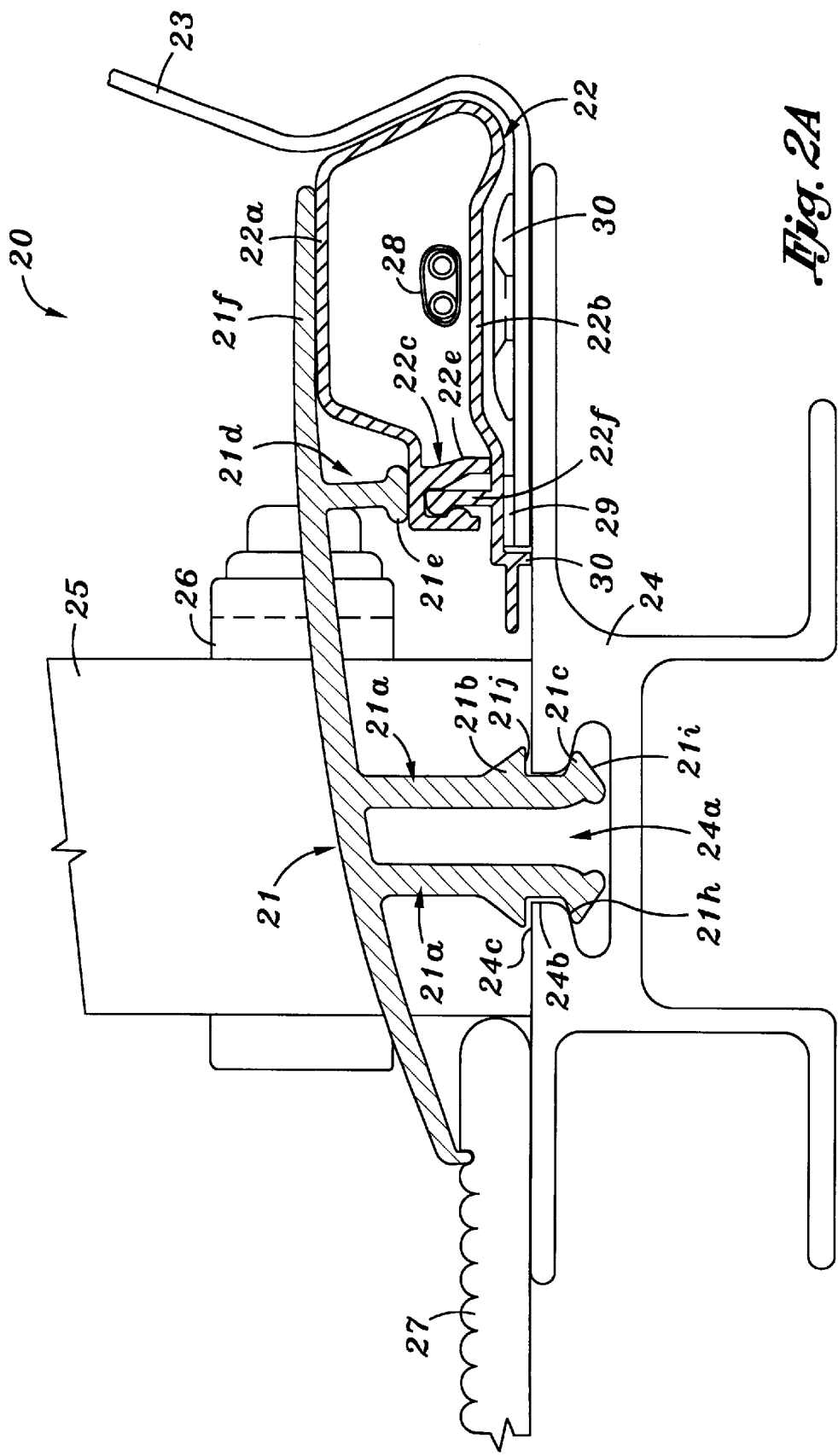
FIG. 2A is a cross sectional view of seat-to-seat wiring assembly according to an embodiment of the present invention.

Referring now to FIG. 2A, a protective wire routing apparatus or assembly 20, such as a seat-to-seat wiring assembly for aircraft, includes a cover 21 that operatively interfaces a raceway 22. Although it is preferred that the cover 21 be a component separate from the raceway 22 to provide ease in manufacturing and installation, the cover 21 and raceway 22 can be a single integrated component. In practice, the cover 21 and the raceway 22 may extend along most or all of a main cabin of an aircraft. Being so used, the wiring assembly 20 may be configured to mate to an adjacent side wall 23 of the cabin and on a support surface on which the assembly 20 is disposed. Registration rib 30, extending from bottom portion of raceway 22, is situated against sidewall 23 to conform the raceway 22 to the support surface. Thus, a side of the raceway 22 can be configured to match the configuration of the side wall 23. Likewise, a bottom portion of the raceway 22 may be configured to match the contour of the support surface. As an example, the support surface may include a washer 30 that may be employed to attach the side wall 23 to a support 24, such as seat track of the aircraft. A foam adhesive 29 may be employed to affix the bottom portion of the raceway 22 to the side wall 23. The cover 21 may be affixed to the seat track 24, as well as to a seat leg 25 having a fastener 26 that may fasten a portion of a seat to the leg 25. As shown for purposes of illustration in FIG. 2A, the cover 21 may be located aft, or forward, of the seat leg 25.

Figure 2C:
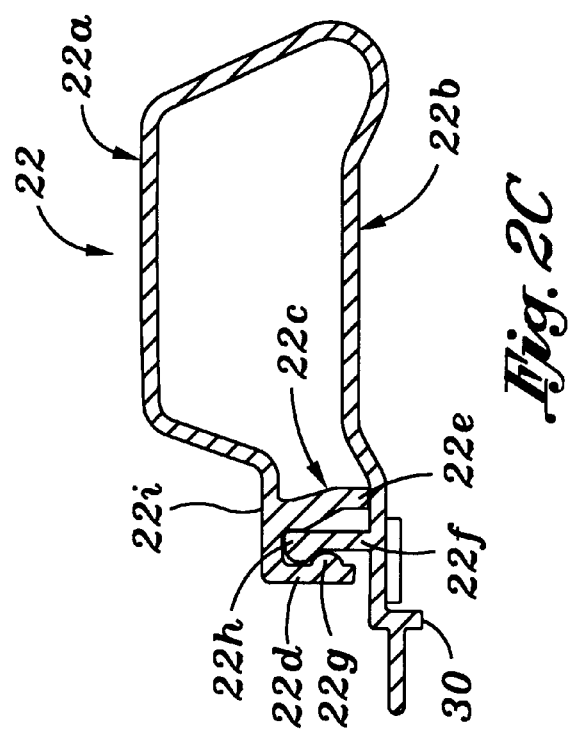
FIG. 2C is a cross sectional view of a raceway that is utilized in the seat-to-seat wiring assembly shown in FIG. 2A.
Figure 2B:
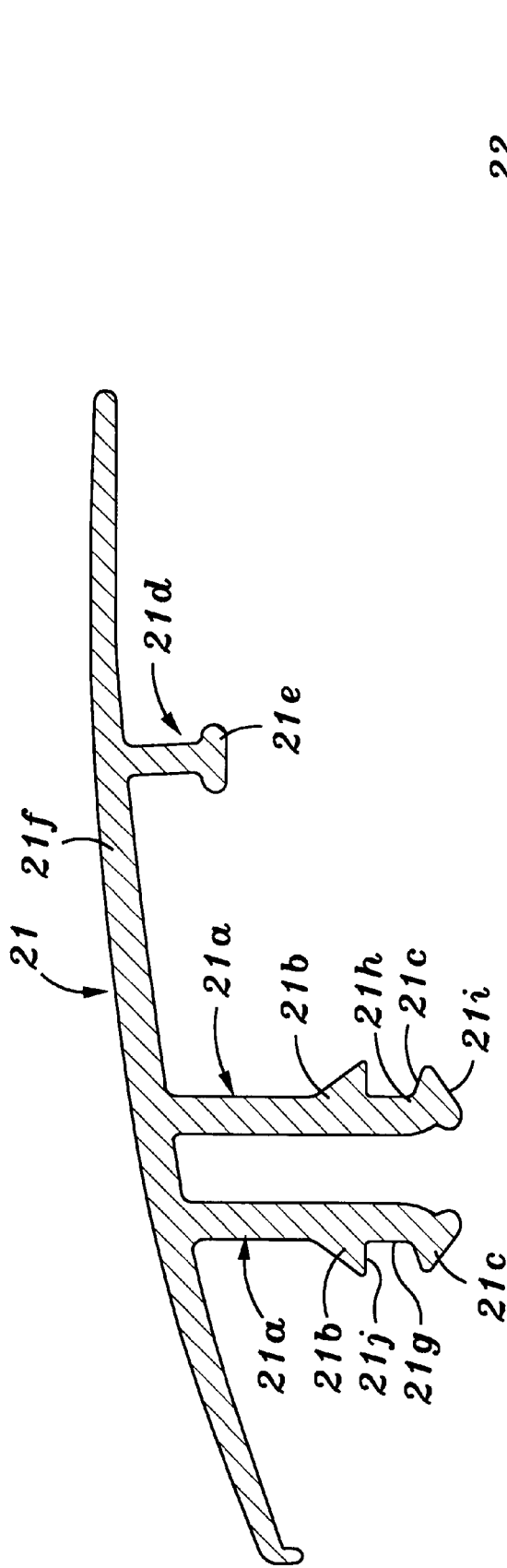
FIG. 2B is a cross sectional view of a cover that is utilized in the seat-to-seat wiring assembly shown in FIG. 2A.

As better shown in FIG. 2B, the cover 21 may have one side supported by a carpet 27, while an opposite side of the cover 21 may be supported by the raceway 22. The cover 21 can be made of a flexible material such as plastic and may comprise a pair of retention legs 21a located proximate the one side of the cover 21 (FIGS. 2A, 2B, and 3A). A load bearing rib 21d having a length less than that of the legs 21a can be located proximate the opposite side of the cover 21. The retention legs 21a and the load bearing rib 21b can be supported by and affixed to a protective portion 21f of the cover 21. The legs 21a can be configured to be affixed to the seat track 24 and, in particular, received in a channel 24a of the seat track 24 such as by press fitting. Thereby, the cover 21 is prevented from lateral and vertical movement relative to the seat track 24.

The absence of relative movement of the cover 21 can be provided by each of the retention legs 21a having a stabilizing rib 21b at an intermediate point along the leg 21a and a guide rib 21c at a distal end of the leg 21a. In combination, the stabilizing rib 21b and the guide rib 21c may form therebetween a depression 21g that can mate to a ledge 24b of the seat track 24. In FIG. 2B, it can be seen that the stabilizing rib 21b can be triangular in cross section with a mating surface 21j (which is flat in this embodiment) that mates with a mating surface 24c (which is flat in this embodiment) of the seat track 24, thus preventing relative lateral movement, and particularly rocking movement. The guide rib 21c may have a somewhat triangular cross section wherein an a guide surface 21i enables the guide rib 21c to be slid past the ledge 24b, such as by press fitting. An engagement surface 21h of the guide rib 21c can thereby be disposed tangentially to the ledge 24b. Consequently, the leg 21a is prevented from vertical movement. Nevertheless, the leg 21a is releasably affixed to the seat track 24 and can be removed therefrom, for example, by prying.

In referring still to FIGS. 2A, 2B, and 3A, the load bearing rib 21d of the cover 21 may include a foot 21e at its distal end to form a T-shape cross section. The load bearing rib 21d, and specifically the foot 21e, may interface a first or top portion 22a of the raceway 22. In so doing, the load bearing rib 21d can transmit a force from the cover 21 to the top portion 22a of the raceway, then to a self-closing portion 22c of the raceway 22, next to a second or bottom portion 22b of the raceway 22, and finally to the seat track or other support 24 on which the wiring assembly 20 is disposed. The transmitted force may be in a vertical direction and come from a passenger's foot or luggage as an example.

In FIG. 2A, it can be seen that the top portion 22a of the raceway 22 may be configured to match the configuration of and be interfaced under the side of the protective portion 21f adjacent the load bearing rib 21d. The raceway 22 can thus be protected from damage. The top portion 22a may also include a shelf 22i that interfaces and may be in contact with the foot 21e of the load bearing rib 21d when the cover 21 is not under a load. The shelf 22i can provide a flat surface to bear against a flat surface of the foot 21e for increased load transfer.

The self-closing portion 22c of the raceway 22 is intermediate the top portion 22a and the bottom portion 22b (FIGS. 2A and 2C). The self-closing portion 22c is denoted as such because the raceway 22 can be made of a flexible material such as plastic so that the raceway 22 can be opened (FIG. 3B) for insertion of wiring 28 (FIG. 2A) and then closed thereafter for installation in the aircraft. The self-closing portion 22c is also characterized by its ability to remain closed but can be opened such as by prying. The foregoing characteristics of the self-closing portion 22c may be provided by a top locking rib 22d and a top guide rib 22e.

The top locking rib 22d may have a top engagement surface 22g (such as in the form of a bump) proximate its distal end to provide for engagement with a bottom engagement surface 22h (such as a bump) proximate a distal end of a bottom locking rib 22f of the bottom portion 22b. Such engagement can be frictional. As seen in FIG. 2A, when no load is on the cover 21, the distal end of the top locking rib 22d may not be in contact with the bottom portion 22b. Even in the presence of such a load, the distal end of the top locking rib 22d may not contact the bottom portion 22b and, thus, not transfer the force of the load to the bottom portion 22b. However, the present invention contemplates that the top locking rib 22d may be dimensioned and configured to transfer such force.

The top guide rib 22e may be inward of the top locking rib 22d and serve to guide the bottom locking rib 22f into a position between the top locking rib 22d and the top guide rib 22e. Accordingly, when the raceway 22 is in a closed position (FIGS. 2A and 2C), the top guide rib 22e interfaces and may be in contact with the bottom portion 22b even in the absence of a load on the cover 21. Similarly, the bottom locking rib 22f interfaces and may be in contact with the upper portion 22a in the absence of a load on the cover 21. Under a load, the top guide rib 22e remains or is placed in contact with the bottom portion 22b, while the bottom locking rib 22f remains or is placed in contact with the upper portion 22a. Both the top rib guide 22e and the bottom locking rib 22f can therefore transmit the force of the load (for example, from a passenger or luggage) to the bottom portion 22b and then to the seat track 24. By such transmission, damage to the raceway 22 and the wiring 28 therein is prevented.

As noted above, the raceway 22 may be made of a single, flexible material. However, the raceway 22 may alternatively be made of two different flexible materials, with the stiffer of the two materials being used in the area of the self-closing portion 22c and the bottom portion 22b adjacent the bottom locking rib 22f. Thereby, the closure portion of the raceway 22 remains flexible enough for opening of the raceway 22 but resilient enough to prevent inadvertent opening.

As can be appreciated by those skilled in the art, the present invention can reduce costs by reducing manufacturing assembly time. Testing has shown a minimum saving of approximately 35 hours for seat-to-seat wiring installation of a Boeing 717. The present invention also reduced the defect rate for wiring that was previously damaged when unsecured wiring migrated into the seat track before a cover was in place. Also eliminated by the present invention is the need for outboard carpet strips.

It should be understood, of course, that the foregoing relates to preferred embodiments of the invention and that modifications may be made without departing from the spirit and scope of the invention as set forth in the following claims.

I claim:

1. A seat-to-seat wiring assembly, comprising:
   a raceway having a top portion, a bottom portion that is opposite said top portion, and a self-closing portion intermediate said top and bottom portions;
   said bottom portion interfaces with a support on which said assembly can be disposed;
   a cover that interfaces with said top portion of said raceway; and
   said cover having a load bearing rib that transmits force from said top portion to said self-closing portion, from said self-closing portion to said bottom portion, and from said bottom portion to said support.

2. The assembly of claim 1, wherein said self-closing portion comprises a top locking rib and a top guide rib.

3. The assembly of claim 2, wherein said bottom portion comprises a bottom locking rib that interfaces with said top locking rib.

4. The assembly of claim 3, wherein said top guide rib transmits said force to said bottom portion.

5. The assembly of claim 4, wherein said top portion comprises a shelf that interfaces with said load bearing rib of said cover and said self-closing portion of said raceway.

6. A protective wiring assembly, comprising:
   a raceway having a top portion, a bottom portion that is opposite said top portion, and a self-closing portion intermediate said top and bottom portions;
   said bottom portion having a bottom locking rib and interfacing with a support on which said assembly can be disposed;
   said self-closing portion having a top locking rib and a top guide rib;
   said top locking rib being engageable to said bottom locking rib;
   a cover that interfaces said top portion of said raceway;
   said cover having a pair of retention legs and a load bearing rib; and
   said load bearing rib transmits force from said top portion to said support.

7. The assembly of claim 6, wherein said top locking rib comprises a top engagement bump.

8. The assembly of claim 7, wherein said bottom locking rib comprises a bottom engagement bump that frictionally engages said top engagement bump.

9. The assembly of claim 8, wherein said top locking rib transmits said force to said support.

10. The assembly of claim 9, wherein said top portion comprises a shelf that interfaces with said load bearing rib.

11. The assembly of claim 1, wherein said load bearing rib comprises a foot that interfaces with said shelf.

12. The assembly of claim 11, wherein each of said retention legs comprises a stabilizing rib and a guide rib.

13. A raceway for protecting wiring, comprising:
    a top portion;
    a bottom portion that is opposite said top portion;
    a self-closing portion intermediate said top and bottom portions;
    said self-closing portion having a top locking rib and a top guide rib;
    said top locking rib having a top engagement bump;
    said top guide rib interfaces with said bottom portion to transmit force from said top portion to said bottom portion;
    said bottom portion having a bottom locking rib that is configured to be disposed between said top locking rib and said top guide rib; and
    said bottom locking rib having a bottom engagement bump to frictionally engage said top engagement bump;
    wherein said top locking rib remains out of contact with said bottom portion in the precence of said force.

14. The raceway of claim 13, wherein said bottom locking rib transmits said force from said top portion to said bottom portion.

15. A protective wire routing apparatus, comprising:
    a raceway having a first portion, a second portion that is opposite said first portion, and a self-closing portion intermediate said first and second portions; and
    a cover that is configured to interface with one of said first and second portions of said raceway;
    said cover having a load bearing rib that transmits force from said first portion to said self-closing portion and from said self-closing portion to said second portion.

16. The apparatus of claim 15, wherein said self-closing portion comprises a second rib to interface with said first and second portions.

17. The apparatus of claim 16, wherein said second rib transmits said force to one of said first and second portions.

18. The apparatus of claim 17, wherein one of said first and second portions is configured to be disposed adjacent a support on which said apparatus can be disposed.

19. The apparatus of claim 18, wherein one of said first and second portions transmits said force to said support.

20. The apparatus of claim 15, wherein said cover further comprises a first leg and a second leg, said first and second legs being configured to engage a support on which said apparatus can be disposed.

21. The apparatus of claim 20, wherein said first and second legs prevent movement of said cover relative to said support.

22. The apparatus of claim 21, wherein said protective portion is configured to interface with one of said first and second portions of said raceway.

23. The apparatus of claim 20, wherein said cover further comprises a protective portion that is affixed to said first leg, second leg, and load bearing rib.

24. The apparatus of claim 15, wherein a registration rib acts to mate said raceway to an adjacent sidewall and on a support surface on which said raceway is disposed.

25. A protective wiring assembly, comprising:
    a raceway having a top portion, a bottom portion that is opposite said top portion, and a self-closing portion intermediate said top and bottom portions;
    said self-closing portion having a top locking rib and a top guide rib;

said bottom portion having a bottom locking rib and interfacing with a support on which said assembly can be disposed;

said top locking rib having a top engagement bump;

said top guide rib interfaces with said bottom portion to transmit force from said top portion to said bottom portion;

said bottom locking rib having a bottom engagement bump to frictionally engage said top engagement bump;

a cover that interfaces said top portion of said raceway;

said cover having a pair of retention legs and a load bearing rib; and said load bearing rib transmits force from said top portion to said support.

26. The assembly of claim 25, wherein a registration rib acts to mate said raceway to an adjacent sidewall and on a support surface on which said raceway is disposed.

27. The assembly of claim 25, wherein said bottom locking rib transmits said force from said top portion to said bottom portion.

28. The raceway of claim 27, wherein said top locking rib remains out of contact with said bottom portion in the presence of s aid force.

29. The raceway of claim 25, wherein said self-closing portion and said bottom portion adjacent the bottom locking rib comprise material stiffer than said top portion.

* * * * *